United States Patent Office 2,979,712
Patented Apr. 11, 1961

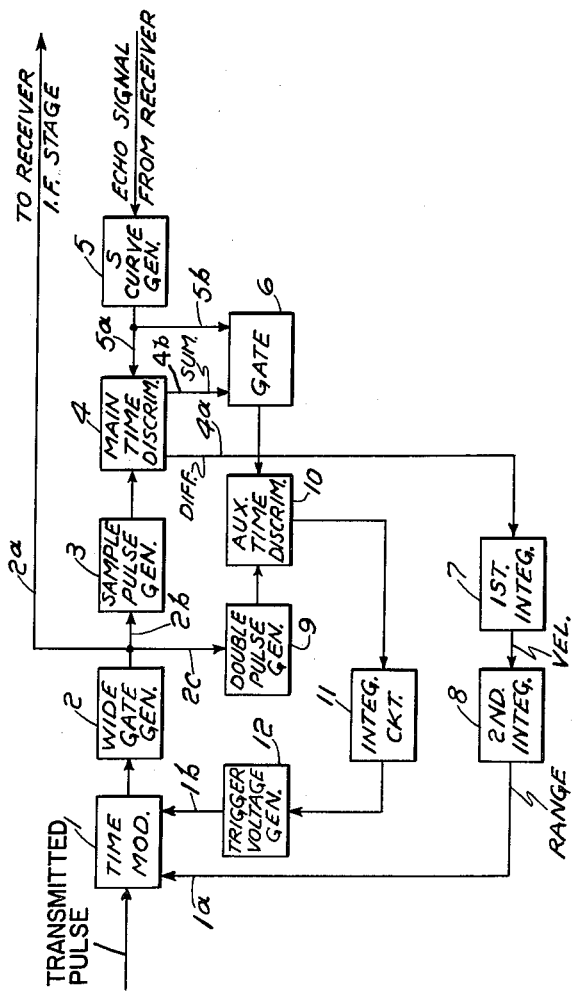

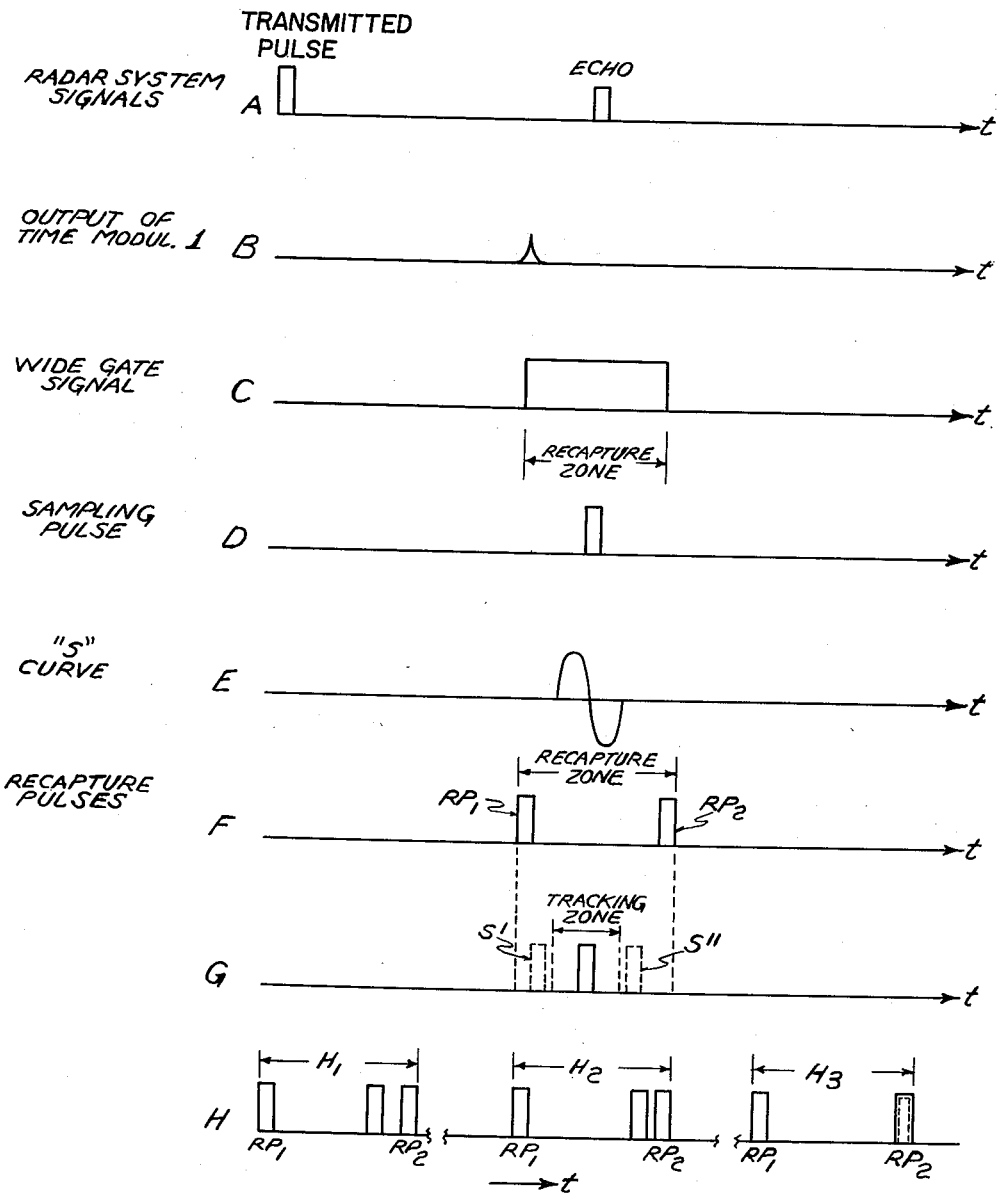

2,979,712
AUTOMATIC ECHO PULSE RECAPTURE CIRCUIT

Julien J. B. Lair, Glen Ridge, N.J., assignor to International Telephone and Telegraph Corporation, Nutley, N.J., a corporation of Maryland Filed Nov. 12, 1954, Ser. No. 468,429

4 Claims. (Cl. 343—7.3)

This invention relates to a radio echo detection system and particularly to means for use with range tracking radar systems for automatically recapturing a lost target echo.

This invention finds particular utility in a radio-echo system wherein a selected target automatically is tracked in range. The usual range tracking radar apparatus includes a transmitter which emits signals reflected by a target and a receiver to detect the reflected signals and supply an indicator whenever a reflection is received. Such an indicator may be provided with a time sweep whereby the position of the indication produced in response to a reflection is indicative of the time lapse between transmission of the signal and reception of the echo and is therefore indicative of range. Range tracking apparatus gates the radar receiver, i.e., renders the receiver or a circuit thereof responsive to the application of a delayed gate applied in time coincidence with the arrival of the reflected echo from a selected target thereby permitting the generation of an error voltage to take place with respect to the positioning of the tracking pulse (which may gate the receiver) and the echo pulse. The error signal is fed back to the range gate generator circuit to vary the time of application (delay) of the gating pulse to the receiver so that as the selected target varies in range with respect to the radar apparatus, the delay in the application of the tracking pulse will also vary. Furthermore such range tracking radar apparatus are usually provided with "memory circuits" which automatically varies the delay in the application of the tracking pulse in accordance with the preceding rate of application so that if for some reason the echo signal is lost the gate applied to the receiver continues to vary at the proper rate to cause it to lie in time coincidence with the echo signal when it returns.

However, it should be quite apparent that the coincidence of the gating pulse and the returned echo pulse is dependent upon the length of time that the echo is lost, that is, the memory tracking circuit will be dependent upon the accuracy of the range rate measurement and the absence of any change in the range rate by the selected target.

After a predetermined period of time the operator of the radar apparatus must assume that the cumulative errors due to noise or other causes have introduced a total error on the gating pulse which would make time coincidence improbable and therefore the operator or the radar system commences to search in range for the selected target echo. Seaching is usually accomplished by causing the tracking or gating pulse to have its maximum or minimum delay (furthest or nearest range) and then varying the time delay to the other end of the range (time delay) scale attempting to locate the echo of the selected target. The search operation proceeding from one range extreme to other necessarily occupies a long period of time during which it is probable that the selected target will completely evade the radar search.

One of the objects of this invention, therefore, is to provide a circuit for automatic recapture of an echo signal for use with radar system apparatus.

Another object is to provide a circuit for use with radar system apparatus having a range gate circuit in which a lost echo signal is recaptured quickly and automatically.

A further object is the provision of an automatic echo recapture circuit which does not search the entire range of a radar system.

One of the features of this invention is the provision for the establishment of a pair of recapture pulses, which bracket in time the position of the echo pulse and upon coincidence of the echo pulse with either of the recapture pulses the tracking circuit is resynchronized.

The above-mentioned and other features and objects of this invention will become more apparent by reference to the following description taken in conjunction with the accompanying drawings, in which:

Figure 1 is a schematic diagram in block form of one embodiment of the automatic echo recapture circuit of my invention in which a pair of automatic recapture pulses are established;

Fig. 2 is a series of curves helpful in the explanation of the block diagram shown in Fig. 1.

The automatic echo pulse recapture circuit of my invention shown in Fig. 1, for use with a radar system including range tracking circuitry, comprises a time modulator 1 which has coupled to it a pulse as shown in Fig. 2, curve A; representing the time of signal transmission by the transmitter and commonly referred to as the transmitted pulse. The time modulator 1 receives the transmitted pulse and delivers a transient signal shown in Fig. 2, curve B, after a time delay which is proportional to the voltage applied to the time modulator 1 over lines 1a and 1b. The transient signal output of time modulator 1 triggers a blocking oscillator or wide gate generator 2 which delivers a wide gate signal delayed in time from the transmitted pulse as shown in Fig. 2, curve C. The wide gate signal output from generator 2 is applied over output line 2a to the receiver of the radar system, to render the receiver responsive only to echos occurring during its duration.

The wide gate signal from the generator 2 is coupled over line 2b to the sample pulse generator 3 which generates a sampling or tracking pulse delayed in time from the start of the wide gate signal by an amount equal to one half the range of the recapturing zone, as shown in Fig. 2, curve D. The sampling pulse from generator 3 is coupled to a time modulator or main time discriminator 4. The echo signal shown in Fig. 2, curve A, is detected by the radar system receiver (not shown) and coupled to S curve generator circuit 5 which generates an S-shaped curve, shown in Fig. 2, curve E, which is analogous to a discriminator curve, in response to the echo signal. The echo signal modified by the S curve of circuit 5 is coupled via lead 5a to the main time discriminator 4 along with the sampling pulse from generator 3. The output of the S curve generator 5 is also coupled via line 5b to the gate circuit 6 which is responsive to the signals coupled to it over line 4b from the main time discriminator 4. The main time discriminator 4 delivers via lines 4a and 4b voltage information responsive to the coincidence of the sampling pulse and the middle of the output of the S curve generator 5.

The portions of the S curve sampled by the sampling pulse are subtracted and the difference signal is coupled over line 4a to the first integrator circuit 7. Thus when a negative voltage is coupled over line 4a it is indicative that the sampling pulse occurs ahead of the echo signal while a positive pulse is indicative of a lagging sampling pulse. The main time discriminator also delivers over line 4b the sum of the portions of the S curve sampled by the sampling pulse. When this sum is at a minimum the signal applied to line 4b opens gate 6 and when the signal is at a maximum the gate 6 is closed.

Assuming that the echo signal is not lost, the "difference" output or error signal from discriminator 4 is coupled to a first integrator circuit 7, which in accordance with usual practice may be termed a velocity memory circuit, the output of which is proportional to rate of change of range. The velocity memory circuit 7 output is coupled to a second integrator circuit 8 or range memory circuit whose output comprises the time information or in other words the output of the range memory circuit 8 is proportional to the range of the selected target (at any instant of time) and includes as its input the information of rate of change of range comprising the output of integrator 7. The output of the range memory circuit 8 is applied over line 1a to vary the time delay in the modulator 1 and thus make the entire system track. The time constants in the integrator circuits 7 and 8 are made to have a relatively long duration so that the voltage output does not vary unduly when transient signals of small duration are applied to the input of the integrator circuits.

Now let it be assumed for purposes of explanation that due to noise, fading or other causes, the selected target echo pulse is lost. Due to the velocity memory incorporated in the first integration circuit 7 the radar system shown in Fig. 1 continues to track the echo pulse at the same velocity as the rate of change of range of the target just prior to the loss of the echo pulse. Simultaneously, the loss of the echo pulse causes the output from the main time discriminator circuit 4 coupled over line 4b to be at a minimum thus opening gate 6. At the same time the wide gate pulse shown in Fig. 2, curve C, is coupled over line 2c to the double gate generator 9 where a first recapturing pulse $RP_1$ is generated at the start of the wide gate pulse and a second recapturing pulse $RP_2$ is generated at the end of the wide gate pulse as shown in Fig. 2, curve F. The output of the double pulse generator 9 comprising recapture pulses $RP_1$ and $RP_2$ is coupled to an auxiliary time discriminator circuit 10. So long as the echo pulse is lost there is no output from the S curve generator 5 coupled over line 5b through gate 6 and thus the output of the auxiliary time discriminator 10 coupled to the integration circuit 11 yields at the output of the integration circuit an average voltage equal to zero.

Let it now be assumed that the cause for the loss of the echo pulse is eliminated and once again an echo pulse signal is coupled from the receiver to the S curve generator 5. If the target had not made any substantial change in its velocity during the period of echo loss or if no noise were detected by the receiver so as to change the velocity signal from circuit 7 the output from the main time discriminator 4 coupled over line 4b to gate 6 will be at a maximum and the gate 6 will be closed. If during the time of echo loss the sampling pulse from sample pulse generator 3 and the center of the S curve coupled from generator 5 have drifted out of synchronization, the output of the main time discriminator 4 will not be at a maximum sufficient to close gate 6 and the output of the S curve generator 5 will be coupled over line 5b through gate 6 into the auxiliary time discriminator 10. If the echo pulse has not drifted sufficiently apart from the sampling pulse it may still be considered to be within the tracking zone as shown in curve G, Fig. 2, and thus the comparison of the sampling pulse with the S curve signal from generator 5 enables the correction voltages to resynchronize the radar system in the usual manner. However, if the sample pulse and the S curve from generator 5 have drifted beyond the boundaries of the tracking zone in either direction such as represented by pulse S' or S'' in curve G of Fig. 2 the usual tracking circuitry will be unable to recover and cause synchronism and results in the whole radar system switching from the track position to the search position and commencing a search outward from a minimum range or inward from a maximum range.

Using the radar system automatic recapture circuit of this invention, when the sampling pulse has drifted beyond the tracking zone, but still within the recapture zone as shown by $H_1$ of curve H, Fig. 2, it is possible for the radar system to be brought into synchronism without necessitating a search period. When the sampling pulse is beyond the tracking zone, but within the recapture zone as shown by portion $H_1$ of curve H of Fig. 2, the sampling pulse and S curve from generator 5 will continue to drift apart as shown by curve $H_2$ of Fig. 2 in curve H until the echo pulse is coincident with one of the two recapture pulses as shown by portion $H_3$ of curve H, Fig. 2. When the echo as modified by the S curve generator 5 coupled over line 5b to the auxiliary discriminator 10 is in time coincident with either of the recapturing pulses $RP_1$ or $RP_2$ the output of integrator circuit 11 will be either positive or negative respectively. In accordance with the sign of the output of the integrator circuit 11, a trigger voltage generator circuit 12 introduces into the time modulator a fixed voltage either positive or negative having the effect of suddenly moving the tracking or sampling pulse to the same time position as the recapturing pulse which is in coincidence with the center of the S curve generator and thus resynchronizing the radar system tracking circuitry with the received echo pulse. The sampling pulse then continues to track and the fixed voltage introduced by the first integrator circuit 7 slowly disappears. When the sampling or tracking pulse again is in synchronism with the center of the S curve from generator 5, the output from the main time discriminator 4 coupled over line 4b is again at maximum closes the gate 11 causing the output of auxiliary time discriminator 10 to disappear since there is no input.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a tracking radar system including a receiver and a range tracking circuit having in combination with said receiver a range gate generator, means coupling said range gate to said receiver to disable said receiver during intervals between range gates, means to produce a first error voltage responsive to the coincidence of received signals with a given portion of said range gate and means for coupling said first error signal to vary the time of occurrence of said range gate; an automatic recapture circuit comprising means coupled to said range gate generator to generate a pair of recapture pulses, means to produce a second error voltage responsive to the coincidence of received signals with one of said recapture pulses and means responsive to said second error voltage for varying the time of occurrence of said range gate to coincide with said received signals.

2. In a tracking radar system including a receiver and a range tracking circuit having in combination with said receiver a range gate generator, means coupling said range gate to said receiver to disable said receiver during intervals between range gates, means to produce a first error voltage responsive to the coincidence of received signals with a given portion of said range gate and means for coupling said first error signal to vary the time of occurrence of said range gate; an automatic recapture circuit comprising means coupled to said range gate generator to generate a pair of recapture pulses, one of said recapture pulses coinciding with the leading edge of said range gate and the other of said recapture pulses coinciding with the trailing edge of said range gate, means to produce a second error voltage responsive to the coincidence of received signals with one of said recapture pulses and means responsive to said second error voltage for varying the time of occurrence of said range gate to coincide with said received signals.

3. In a tracking radar system including a receiver and a range tracking circuit having in combination with said receiver a range gate generator, means coupling said range gate to said receiver to disable said receiver during intervals between range gates, means to compare the time position of received signals with a given portion of said range gate to produce a first error signal whose polarity is indicative of the relative positions of said received signal and said range gate, means responsive to the polarity of said first error signal to vary the time of occurrence of said range gate; an automatic recapture circuit comprising means coupled to said range gate generator to generate a pair of recapture pulses, means to produce a second error signal responsive to the coincidence of received signals with one of said recapture pulses and means responsive to said second error signal for coupling voltage to said range gate generator means to vary the occurrence of said gate to coincide with said received signals.

4. A tracking radar system comprising a radar pulse transmitter, a receiver for detecting reflected target echos and a range gate tracking circuit having in combination means to generate a trigger signal delayed in time from the transmitted radar pulse; a range gate generator responsive to said trigger signal, a sampling pulse generator responsive to said range gate, a main time discriminator for comparing in time said sampling pulse and said detected echo signal to produce a difference and a sum error signal, means to vary the time of occurrence of said range gate responsive to said error signal, means to generate a pair of recapture pulses responsive to said transmitted radar pulse, means responsive to said sum error signal to compare in time said received echoes with said recapture pulses and means responsive to said last mentioned comparison means to generate a voltage to cause coincidence between said echo pulse and said sampling pulse.

References Cited in the file of this patent
UNITED STATES PATENTS

| | | |
|---|---|---|
| 2,495,753 | Mozley | Jan. 31, 1950 |
| 2,516,356 | Tull et al. | July 25, 1950 |
| 2,624,877 | Chance | Jan. 6, 1953 |